US012676878B2

(12) United States Patent
Tishbi et al.

(10) Patent No.: US 12,676,878 B2
(45) Date of Patent: Jul. 7, 2026

(54) SYSTEM AND METHOD FOR DETECTING PROTECTION GAP IN CYBERSECURITY

(71) Applicant: Avalor Technologies, Ltd., Ramat Gan (IL)

(72) Inventors: Kfir Aharon Tishbi, Herzliya (IL); Raanan Raz, Tel Aviv (IL)

(73) Assignees: Avalor Technologies, Ltd., Ramat Gan (IL); Zscaler, Inc., San Jose, CA (US)

( * ) Notice: Subject to any disclaimer, the term of this patent is extended or adjusted under 35 U.S.C. 154(b) by 190 days.

(21) Appl. No.: 18/409,361

(22) Filed: Jan. 10, 2024

(65) Prior Publication Data

US 2025/0227124 A1    Jul. 10, 2025

(51) Int. Cl.
H04L 9/40         (2022.01)

(52) U.S. Cl.
CPC ................................ H04L 63/1433 (2013.01)

(58) Field of Classification Search
CPC .................................................. H04L 63/1433
See application file for complete search history.

(56) References Cited

U.S. PATENT DOCUMENTS

| | | | | |
|---|---|---|---|---|
| 8,850,587 | B2 * | 9/2014 | Nair ...................... | H04L 41/044 |
| | | | | 709/224 |
| 10,395,271 | B2 | 8/2019 | Kassko et al. | |
| 10,754,877 | B2 | 8/2020 | Kassko et al. | |
| 11,316,875 | B2 | 4/2022 | Frey et al. | |
| 11,575,693 | B1 | 2/2023 | Muddu et al. | |
| 11,783,515 | B2 | 10/2023 | Sheffer et al. | |
| 11,882,143 | B1 * | 1/2024 | Garcia Correa .... | H04L 63/1433 |
| 12,028,368 | B1 * | 7/2024 | Cohen ................. | H04L 63/1433 |
| 12,363,145 | B1 * | 7/2025 | Vashisht .............. | H04L 63/102 |
| 2020/0059479 | A1 * | 2/2020 | Sloane .................... | G06F 9/451 |
| 2020/0259728 | A1 | 8/2020 | Oren et al. | |
| 2020/0366706 | A1 * | 11/2020 | Sexton ................ | H04L 63/1425 |
| 2021/0288995 | A1 | 9/2021 | Attar et al. | |
| 2022/0345472 | A1 * | 10/2022 | Kling ..................... | G06N 20/00 |
| 2025/0055869 | A1 * | 2/2025 | Barel .................. | H04L 63/1433 |
| 2025/0085996 | A1 * | 3/2025 | Suman .................. | G06F 21/602 |
| 2025/0106261 | A1 * | 3/2025 | Sridhar ............... | H04L 63/1416 |
| 2025/0159024 | A1 * | 5/2025 | Assayag ............. | H04L 63/0236 |
| 2025/0173444 | A1 * | 5/2025 | Koren .................... | G06F 21/577 |
| 2025/0247414 | A1 * | 7/2025 | Baragaba ............. | H04L 63/1433 |
| 2025/0258920 | A1 * | 8/2025 | Ben-Noon ........... | H04W 12/08 |
| 2025/0258951 | A1 * | 8/2025 | Thompson .......... | G06F 21/6218 |
| 2025/0317446 | A1 * | 10/2025 | Malian .................. | H04L 63/102 |

FOREIGN PATENT DOCUMENTS

| | | | | |
|---|---|---|---|---|
| CN | 114978584 B | * 10/2024 | ......... | H04L 63/1466 |
| JP | 2006331422 A | * 12/2006 | ............. | H04L 63/08 |

* cited by examiner

*Primary Examiner* — Sarah Su
(74) *Attorney, Agent, or Firm* — Baratta Law PLLC; Lawrence A. Baratta, Jr.

(57)         ABSTRACT

A system and method for detecting a protection gap in a cybersecurity system is provided. The method includes scanning a computing environment to detect a cybersecurity monitoring system connected to the computing environment; scanning the computing environment to detect a plurality of resources deployed in the computing environment; detecting a resource of the plurality of resources which is of a first resource type; determining that the cybersecurity monitoring system is not configured to monitor the first resource type; and initiating a mitigation action in response to determining that the cybersecurity monitoring system is not configured to monitor the first resource type.

20 Claims, 3 Drawing Sheets

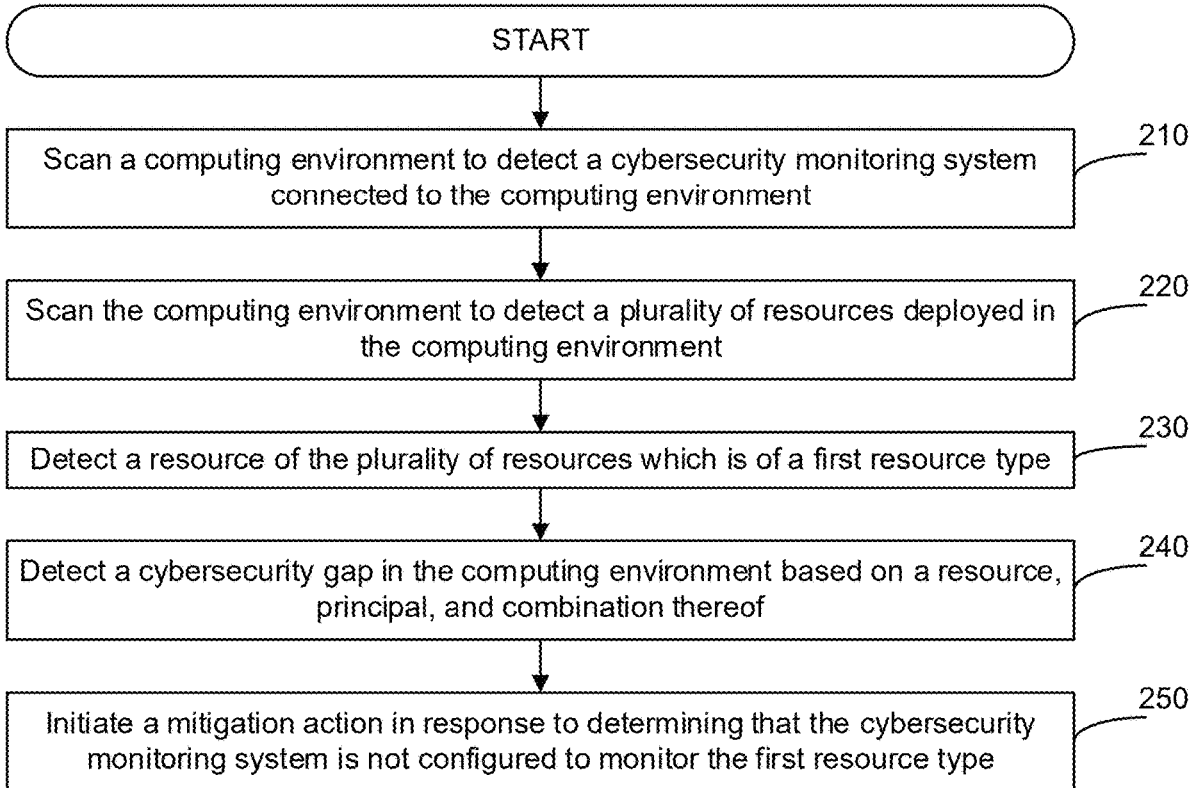

START

Scan a computing environment to detect a cybersecurity monitoring system connected to the computing environment                     210

Scan the computing environment to detect a plurality of resources deployed in the computing environment                     220

Detect a resource of the plurality of resources which is of a first resource type                     230

Detect a cybersecurity gap in the computing environment based on a resource, principal, and combination thereof                     240

Initiate a mitigation action in response to determining that the cybersecurity monitoring system is not configured to monitor the first resource type                     250

FIGURE 2

SYSTEM AND METHOD FOR DETECTING PROTECTION GAP IN CYBERSECURITY

TECHNICAL FIELD

The present disclosure relates generally to cybersecurity protection of computing environments, and specifically to detecting gaps in protection of the computing environment.

BACKGROUND

Computing environments, and specifically cloud computing environments, are increasingly complex, including many components, infrastructure, and the like. Further increasing this complexity, resources in a cloud computing environment are ever changing.

Many cybersecurity monitoring solutions exist which detect misconfigurations, vulnerabilities, exposures, and the like. Additionally, identity and access management services are configured to limit access to resources in a computing environment.

Protection needs can therefore change, based on the existing infrastructure at the time, based on access and available credentials, and others, making the task of ensuring protection a complicated one.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include scanning a computing environment to detect a cybersecurity monitoring system connected to the computing environment. Method may also include scanning the computing environment to detect a plurality of resources deployed in the computing environment. Method may furthermore include detecting a resource of the plurality of resources which is of a first resource type. Method may in addition include determining that the cybersecurity monitoring system is not configured to monitor the first resource type. Method may moreover include initiating a mitigation action in response to determining that the cybersecurity monitoring system is not configured to monitor the first resource type. Other embodiments of this aspect include corresponding computer systems, apparatus, and computer programs recorded on one or more computer storage devices, each configured to perform the actions of the methods.

Implementations may include one or more of the following features. Method may include: configuring a second cybersecurity monitoring system to connect to the computing environment, where the second cybersecurity monitoring system is configured to monitor the first resource type. Method may include: detecting a protection overlap between the first cybersecurity monitoring system and the second cybersecurity monitoring system. Method may include: generating a notification to disable the first cybersecurity monitoring system in response to detecting the protection overlap. Method may include: configuring the cybersecurity monitoring system to monitor an additional portion of the computing environment, including the resource. Method where detecting the resource further comprises: detecting any one of: an operating system, an application, a software library, a software binary, a workload, a virtual machine, a software container, a serverless function, and a combination thereof. Method may include: detecting a third party software connector in the computing environment; and detecting a cybersecurity protection gap between the third party software connector and the computing environment. Implementations of the described techniques may include hardware, a method or process, or a computer tangible medium.

In one general aspect, non-transitory computer-readable medium may include one or more instructions that, when executed by one or more processors of a device, cause the device to: scan a computing environment to detect a cybersecurity monitoring system connected to the computing environment. Medium may furthermore scan the computing environment to detect a plurality of resources deployed in the computing environment. Medium may in addition detect a resource of the plurality of resources which is of a first resource type. Medium may moreover determine that the cybersecurity monitoring system is not configured to monitor the first resource type. Medium may also initiate a mitigation action in response to determining that the cybersecurity monitoring system is not configured to monitor the first resource type. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: scan a computing environment to detect a cybersecurity monitoring system connected to the computing environment. System may in addition scan the computing environment to detect a plurality of resources deployed in the computing environment. System may moreover detect a resource of the plurality of resources which is of a first resource type. System may also determine that the cybersecurity monitoring system is not configured to monitor the first resource type. System may furthermore initiate a mitigation action in response to determining that the cybersecurity monitoring system is not configured to monitor the first resource type. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: configure a second cybersecurity monitoring system to connect to the computing environment, where the second cybersecurity monitoring system is configured to monitor the first resource type. System where the memory contains further instructions which when executed by the processing circuitry further configure the system to: detect a protection overlap between the first cybersecurity monitoring system and the second cybersecurity monitoring system. System where the memory contains further instructions which when executed by the processing circuitry further configure the system to: generate a notification to disable the first cybersecurity monitoring system in response to detecting the protection overlap. System where the memory contains further instructions which when executed by the processing circuitry further configure the system to: configure the cybersecurity monitoring system to monitor an additional portion of the computing environment, including the resource. System where the memory contains further instructions that, when executed by the processing circuitry for detecting the resource, further configure the system to: detect any one of: an operate system, an application, a software library, a software binary, a workload, a virtual machine, a software container, a serverless function, and a combination thereof. System where the memory contains further instructions which when executed by the processing circuitry further configure the system to: detect a third party software connector in the computing environment; and detect a cybersecurity protection gap between the third party software connector and the computing environment. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 2 is an example flowchart of a method for detecting a cybersecurity gap, implemented in accordance with an embodiment.

DETAILED DESCRIPTION

Figure 1:
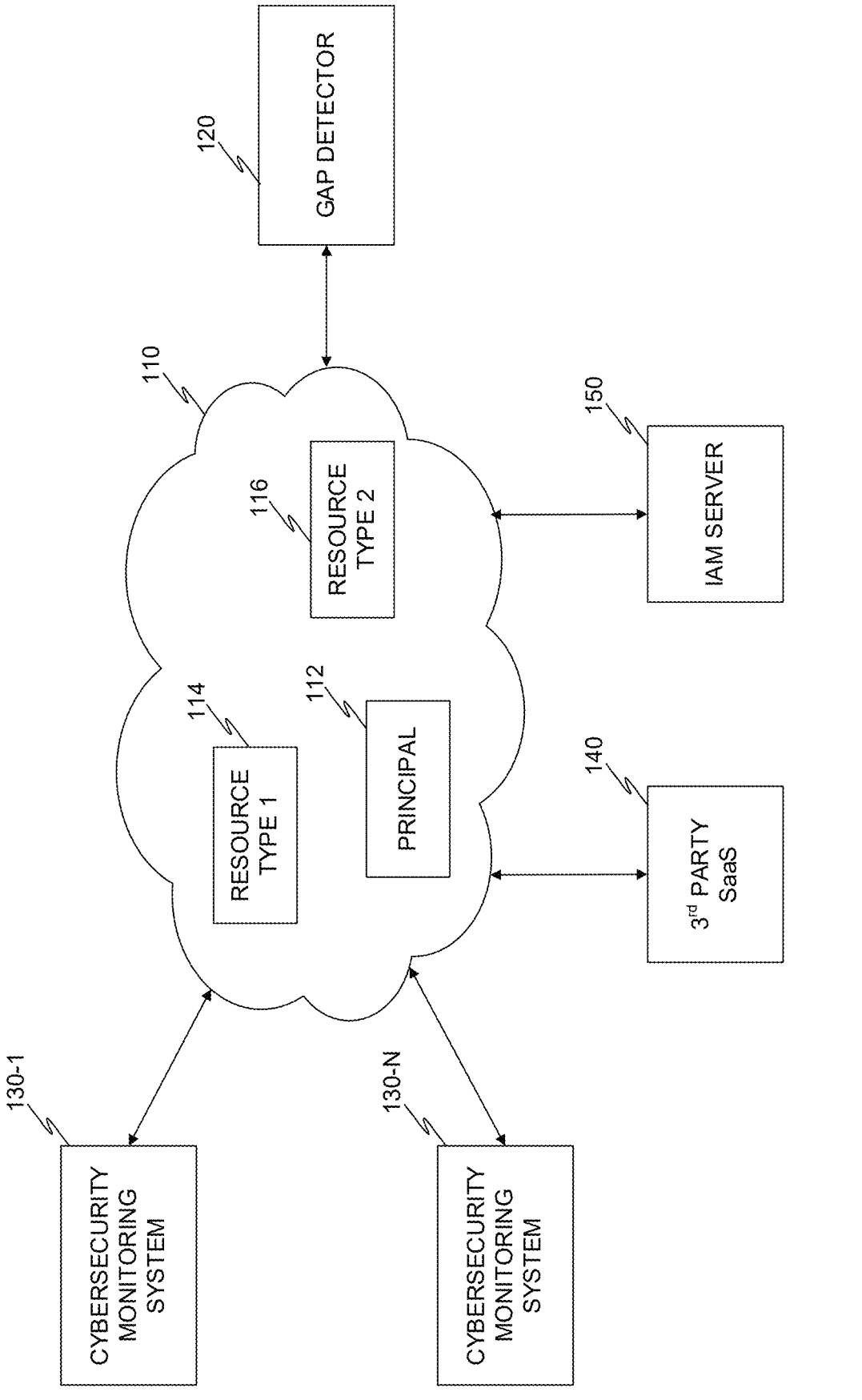
FIG. 1 is an example schematic illustration of a network diagram of a computing environment including cybersecurity gap detection, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for detecting a gap in cybersecurity monitoring of a computing environment. According to an embodiment, a protection gap exists where a cybersecurity monitoring system is configured to monitor a portion of a computing environment, leaving another portion of the computing environment unmonitored.

In some embodiments, a protection gap occurs where there is overlap in cybersecurity monitoring. For example, in an embodiment, a first cybersecurity monitoring system is configured to monitor a portion of the computing environment and a second cybersecurity monitoring system is configured to monitor the entire computing environment. Thus, the first cybersecurity monitoring system is redundant.

In certain embodiments, a protection gap includes a cybersecurity monitoring system which is configured to monitor the computing environment for a first cybersecurity object, but not for a second cybersecurity object, wherein each cybersecurity object indicates a cybersecurity threat.

In some embodiments, the protection gap includes a cybersecurity monitoring system which is configured to monitor the computing environment for a first type of resource, but not for a second type of resource, where the computing environment includes resources of the first type and of the second type.

Accordingly, it is beneficial to detect such protection gaps in cybersecurity monitoring, in order to provide accurate monitoring, in order to initiate remediation actions, in order to initiate mitigation actions, in order to decrease redundant systems, etc.

FIG. 1 is an example schematic illustration of a network diagram of a computing environment including cybersecurity gap detection, utilized to describe an embodiment. According to an embodiment, a computing environment 110 includes a plurality of resources and principals. In an embodiment, the computing environment 110 is a cloud computing environment, an on-prem environment, a hybrid-environment, a combination thereof, and the like.

In some embodiments, the computing environment 110 includes a virtual private cloud (VPC), a virtual network (VNet), a virtual private network (VPN), a combination thereof, and the like. In an embodiment, where the computing environment 110 is a cloud computing environment, the computing environment 110 is deployed on a cloud computing infrastructure. According to an embodiment, a cloud computing infrastructure is, for example, Amazon® Web Services (AWS), Google® Cloud Platform (GCP), Microsoft® Azure, and the like.

In certain embodiments, a resource is a virtual resource, a hardware resource, a combination thereof, and the like. In some embodiments, a resource exposes a hardware, a capability, a software service, and the like, in the computing environment 110. For example, in an embodiment, the computing environment 110 includes a resource of a first type 114, and a resource of a second type 116.

In some embodiments, a resource is, for example, a virtual machine, a software container, a serverless function, an application, a storage service, an operating system, a software image, a microservice, various combinations thereof, and the like.

For example, in an embodiment, the resource of a first type 114 is a virtual machine, and the resource of the second type 116 is a serverless function. In an embodiment, a virtual machine is implemented as an Oracle® VirtualBox, a serverless function is implemented as Amazon® Lambda, and a software container is implemented utilizing Kubernetes®, Docker®, and the like.

In an embodiment, a plurality of cybersecurity monitoring systems 130-1 through 130-N are configured to monitor the computing environment 110 for cybersecurity issues, cybersecurity threats, cybersecurity objects, various combinations thereof, and the like. In certain embodiments, the cybersecurity monitoring systems 130-1 through 130-N are referred to collectively as cybersecurity monitoring systems 130, and individually as cybersecurity monitoring system 130, where 'N' is an integer having a value of '2' or greater. As an example, in an embodiment, a cybersecurity threat is a misconfiguration, a vulnerability, an exposure, a combination thereof, and the like.

According to an embodiment, the plurality of cybersecurity monitoring system 130 are each configured to detect a different cybersecurity issue, detect a cybersecurity issue only on a first type of resource, detect the cybersecurity issue only on the second type of resource, a combination thereof, and the like.

In an embodiment, the computing environment 110 includes a plurality of principals, such as principal 112. In some embodiments, a principal is a computing entity which is configured to initiate actions in the computing environment 110. In certain embodiments, a principal 112 is a user account, a service account, a user group, a role, a combination thereof, and the like.

In some embodiments, the computing environment 110 allows a third party software provider, such as SaaS provider 140, to interface with the computing environment 110. For example, in an embodiment, the SaaS provider 140 is configured to assume a service account and initiate actions in the computing environment 110. In some embodiments, the SaaS provider 140 is configured to access the computing environment 110 through an application programming interface (API) of the computing environment 110.

In an embodiment, the SaaS provider 140 is a potential cybersecurity threat, as it has access to the computing environment 110, can initiate actions therein, and is not monitored by a cybersecurity monitoring system 130 of the computing environment 110. Therefore, in an embodiment, the SaaS provider 140 constitutes a gap in cybersecurity protection, as the SaaS provider 140 may introduce a cybersecurity threat into the computing environment 110, or may become compromised, which would lead to a lateral movement attack into the computing environment 110.

According to an embodiment, a gap detector 120 is configured to detect cybersecurity gaps in protection of the computing environment 110. For example, in an embodiment, the detector 120 is configured to perform network discovery to discover assets, resources, principals, and the like, in the computing environment 110.

In some embodiments, the detector 120 is configured to detect connectors in the computing environment 110 which connect the computing environment 110 to external networks, external software solutions, combinations thereof, and the like. For example, a cybersecurity monitoring solution 130 and a third party SaaS provider 140 are external software solutions which are configured to access the computing environment 110, according to an embodiment.

In certain embodiments, detector 120 is configured to determine, for each cybersecurity monitoring system 130, a monitoring capability. For example, in an embodiment, a first cybersecurity monitoring system 130-1 is configured to detect misconfigurations in a virtual machine, and a second cybersecurity monitoring system 130-N is configured to detect a vulnerability in a software container.

In some embodiments, the detector 120 is configured to query a cybersecurity monitoring system 130 to receive a list of monitored assets, each asset deployed in the computing environment 110. In certain embodiments, the detector 120 is configured to query an identity and access management (IAM) server 150 to detect a list of principals and their respective permissions, roles, and the like, which are authorized to initiate actions in the computing environment 110. In an embodiment, the IAM server 150 is, for example implemented utilizing Okta®.

According to an embodiment, the detector 120 is further configured to initiate a mitigation action in the computing environment 110. For example, in an embodiment, the detector 120 is configured to assume a role, a service account, a principal 112, and the like, and initiate an action, such as a mitigation action, in the computing environment 110.

In some embodiments, the mitigation action includes configuring a second cybersecurity monitoring system 130-N to monitor the computing environment 110 for a cybersecurity issue monitored by the second cybersecurity monitoring system 130-N and not monitored by the first cybersecurity monitoring system 130-1. This is advantageous, for example, where the second cybersecurity monitoring system 130-N was not previously configured to monitor the computing environment 110.

In certain embodiments, the detector 120 is configured to modify, alter, change, and the like, a permission, a role, etc., associated with a third party SaaS provider 140, for example as a mitigation action. In an embodiment, the detector 120 is configured to detect a permission, role, and the like, associated with the SaaS provider 140 and remove the permission. In some embodiments, removing a permission is performed in response to detecting that a principal associated with the SaaS provider 140 has not logged in, provided credentials, etc., for a period of time exceeding a predetermined value (e.g., over ten days).

In an embodiment, the detector 120 is configured to initiate a mitigation action including revoking access to a resource, revoking access from a resource, revoking access to a principal 112, revoking access from a principal 112, generating an alert, generating a support ticket, modifying a severity of an existing alert, modifying a severity of an existing support ticket, a combination thereof, and the like.

FIG. 2 is an example flowchart of a method for detecting a cybersecurity gap, implemented in accordance with an embodiment. In an embodiment, detecting a gap in cybersecurity protection is advantageous as it allows to initiate mitigating actions, for example in order to close any such gap. Additionally, the system discussed herein, which is configured to perform at least a method disclosed throughout, is advantageous as it allows to apply objective criteria in detection of what constitutes a cybersecurity gap. Additionally, due to the dynamic changes in computing environments, and more specifically in cloud computing environments, it is impossible for a human to detect cybersecurity gaps at a speed which would be comparable to the rate of change these computing environments undergo. All the more so, it is not possible for a human to perform these actions using objective criteria at such a high rate.

At S210, a cybersecurity monitoring system is detected. In an embodiment, a computing environment is scanned to detect a connector, a service account, and the like, which are associated with a cybersecurity monitoring system. In some embodiments, a cybersecurity monitoring system deploys a connector in the computing environment, such as a serverless function, which is configured to facilitate communication between the cybersecurity monitoring system and the computing environment.

In an embodiment, a detector is configured to detect the cybersecurity monitoring system, for example by detecting the connector deployed as a serverless function in the computing environment.

In some embodiments, a detector is configured to initiate a network scan in the computing environment, to detect artifacts, principals, workloads, resources, and the like, which are utilized by a cybersecurity monitoring system and indicate that the same is connected to the computing environment.

In certain embodiments, a detector is configured to determine, based on a detected cybersecurity monitoring system, a monitoring capability of the cybersecurity monitoring system. For example, in an embodiment, a first cybersecurity monitoring solution is configured to detect cybersecurity issues of a first type, and is unable to detect cybersecurity issues of a second type. In other embodiments, a first cybersecurity monitoring system is configured to detect a cybersecurity issue on resources of a first type (e.g., virtual machine), and is unable to detect the cybersecurity issue on a resource of a second type (e.g., serverless function).

At S220, a plurality of resources are detected. In an embodiment, a resource is an entity in the computing environment which provides a service, exposes a resource (e.g., storage, memory, processor, etc.), a combination thereof, and the like. In some embodiments, the plurality of resources are detected in a single computing environment, in multiple computing environments, and the like.

In an embodiment, a detector is configured to initiate a network scan of the computing environment in order to detect resources, such as virtual machines, software containers, serverless functions, appliances, applications, operating systems, software libraries, software binaries, various combinations thereof, and the like.

In some embodiments, each resource is associated with a resource type. For example, a resource type is, according to an embodiment, an application, a virtual instance, a virtual machine, a software container, a serverless function, etc.

In certain embodiments, a detector is further configured to detect principals in the computing environment, such as user accounts, service accounts, local accounts, system accounts, user groups, roles, a combination thereof, and the like. In an embodiment, the detector is configured to query, for example based on an identifier, an identity and access management service to detect a permission, a role, a policy, and the like, which is associated with the principal.

At S230, a resource of a first type is detected. In an embodiment, a resource type is determined for each detected resource. In some embodiments, a resource includes a plurality of types. For example, a resource is associated with a 'virtual machine' type, and is further associated with a specific 'application' type, which indicates that a specific application is executed on the virtual machine.

In an embodiment, each resource type is associated with potential cybersecurity issues. For example, in an embodiment, an application type resource is associated with potential misconfiguration cybersecurity issues. As another example, a virtual machine type resource is associated with an exposure cybersecurity issue (for example due to an open port).

In an embodiment, a principal is associated with a type. For example, in some embodiments, a principal is a local account type, an administrator account type, an external access account type, and the like. In certain embodiments, where access is provided to third parties, SaaS providers, infrastructure as code (IaC) providers, platform as a service (PaaS) providers, and the like, such access is provided through an external access account, indicating that a principal operating in the computing environment using such credentials is external to the computing environment.

In certain embodiments, such external access accounts can compromise a computing environment, as they are associated with other computing environments which are outside the control and monitoring capability of the computing environment. For example, a lateral movement attack is possible by gaining access to a third party, then utilizing credentials of the third party in the computing environment.

At S240, a gap is detected. In an embodiment, a cybersecurity gap is detected based on a resource, a resource type, a principal, a principal type, a combination thereof, and the like.

For example, in an embodiment, a resource is detected of a first type, and a detector is configured to determine that the detect cybersecurity monitoring system is not configured to detect cybersecurity issues on a resource of the first type.

In certain embodiments, the gap is detected with respect to a principal. For example, in an embodiment, a detector is configured to detect a principal which has utilized a credential at a time period exceeding a predetermined value. In some embodiments, the detector is configured to detect a principal having a permission which excessive, for example, an external account having administrator privilege. In an embodiment, a gap with respect to a principal is detected by querying an identity and access management service to detect a permission, role, and the like, associated with the principal.

At S250, a mitigation action is initiated. According to an embodiment, a detector is configured to initiate a mitigation action in the computing environment. For example, in an embodiment, the detector is configured to assume a role, a service account, a principal, and the like, and initiate an action, such as a mitigation action, in the computing environment.

In some embodiments, the mitigation action includes configuring a second cybersecurity monitoring system monitor the computing environment for a cybersecurity issue monitored by the second cybersecurity monitoring system and not monitored by a first cybersecurity monitoring system. This is advantageous, for example, where the second cybersecurity monitoring system was not previously configured to monitor the computing environment.

In an embodiment, a detector is configured to initiate a mitigation action including revoking access to a resource, revoking access from a resource, revoking access to a principal, revoking access from a principal, generating an alert, generating a support ticket, modifying a severity of an existing alert, modifying a severity of an existing support ticket, a combination thereof, and the like.

In certain embodiments, a detector is configured to modify, alter, change, and the like, a permission, a role, etc., associated with an external account. In an embodiment, the detector is configured to detect a permission, role, and the like, associated with the external account and remove the permission.

Figure 3:
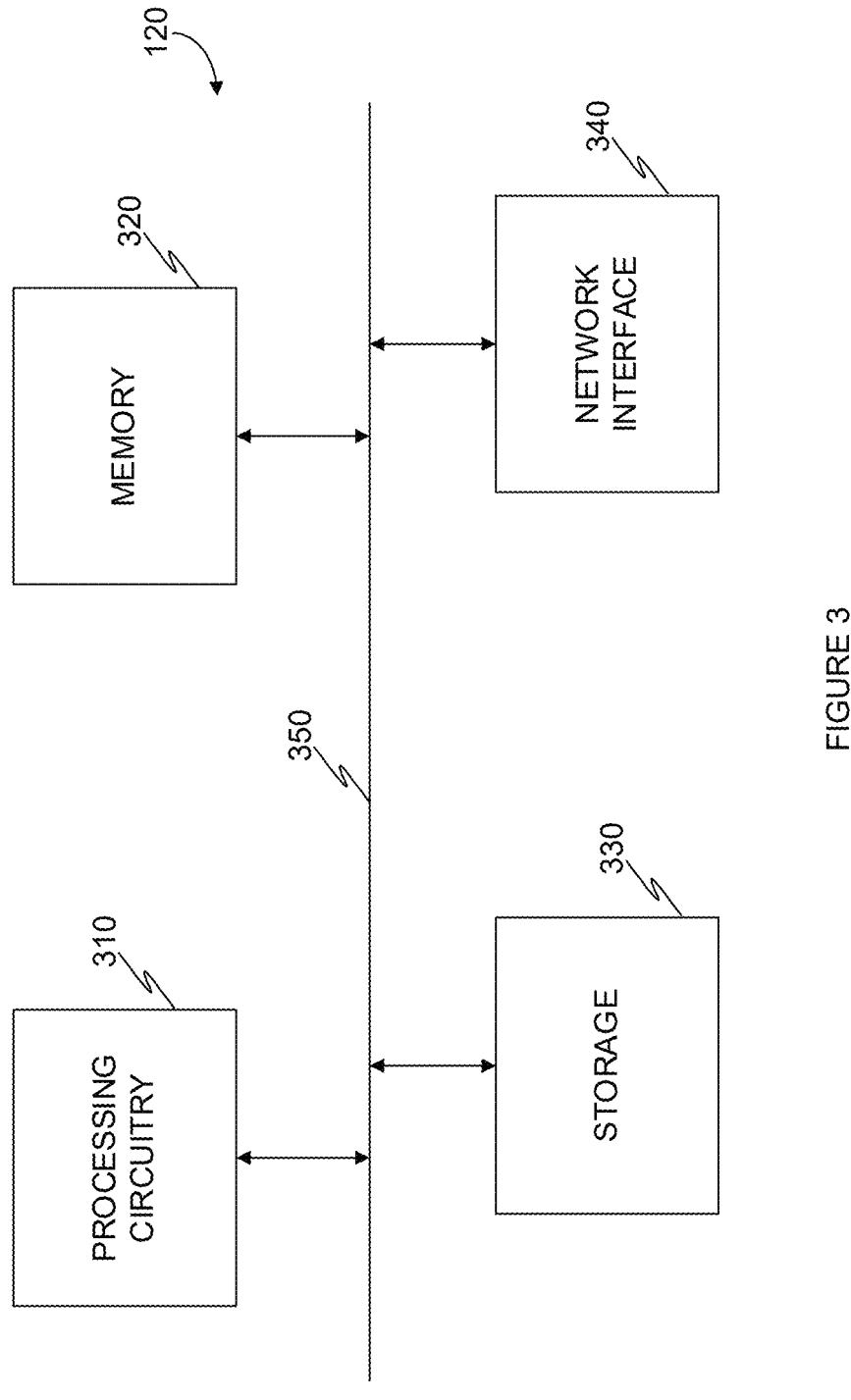
FIG. 3 is an example schematic diagram of a gap detector according to an embodiment.

FIG. 3 is an example schematic diagram of a gap detector 120 according to an embodiment. The gap detector 120 includes a processing circuitry 310 coupled to a memory 320, a storage 330, and a network interface 340. In an embodiment, the components of the gap detector 120 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 320 may be volatile (e.g., random access memory, etc.), non-volatile (e.g., read only memory, flash memory, etc.), or a combination thereof. In an embodiment, the memory 320 is an on-chip memory, an off-chip memory, a combination thereof, and the like. In certain embodiments, the memory 320 is a scratch-pad memory for the processing circuitry 310.

In one configuration, software for implementing one or more embodiments disclosed herein may be stored in the storage 330, in the memory 320, in a combination thereof, and the like. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 310, cause the processing circuitry 310 to perform the various processes described herein.

The storage 330 is a magnetic storage, an optical storage, a solid-state storage, a combination thereof, and the like, and is realized, according to an embodiment, as a flash memory, as a hard-disk drive, or other memory technology, or any other medium which can be used to store the desired information.

The network interface 340 is configured to provide the gap detector 120 with communication with, for example, the computing environment 110, the cybersecurity monitoring system 130, and the like.

It should be understood that the embodiments described herein are not limited to the specific architecture illustrated in FIG. 3, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. More-over, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting a protection gap in a cybersecurity system, comprising:

scanning a computing environment to detect a cybersecurity monitoring system connected to the computing environment, the scanning comprising detecting, in the computing environment, a connector associated with the cybersecurity monitoring system, the connector deployed as a serverless function in the computing environment;

scanning the computing environment to detect a plurality of resources deployed in the computing environment;

detecting a resource of the plurality of resources which is of a first resource type, each resource of the plurality of resources being associated with a respective resource type;

querying the cybersecurity monitoring system to obtain an indication of monitored assets deployed in the computing environment;

determining that the cybersecurity monitoring system is not configured to monitor the first resource type by determining that the resource of the first resource type is omitted from the indication of monitored assets; and initiating a mitigation action in response to determining that the cybersecurity monitoring system is not configured to monitor the first resource type, the mitigation action comprising, via an identity and access management service of the computing environment, modifying a permission associated with a principal of a third party software connector having access to the computing environment by revoking the permission.

2. The method of claim 1, further comprising:

configuring a second cybersecurity monitoring system to connect to the computing environment, wherein the second cybersecurity monitoring system is configured to monitor the first resource type.

11
12

3. The method of claim 2, further comprising:

detecting a protection overlap between the first cybersecurity monitoring system and the second cybersecurity monitoring system.

4. The method of claim 3, further comprising:

generating a notification to disable the first cybersecurity monitoring system in response to detecting the protection overlap.

5. The method of claim 1, further comprising:

configuring the cybersecurity monitoring system to monitor an additional portion of the computing environment, including the resource.

6. The method of claim 1, wherein detecting the resource further comprises:

detecting any one of: an operating system, an application, a software library, a software binary, a workload, a virtual machine, a software container, a serverless function, and a combination thereof.

7. The method of claim 1, further comprising:

detecting a third party software connector in the computing environment; and detecting a cybersecurity protection gap between the third party software connector and the computing environment.

8. The method of claim 1, wherein scanning the computing environment to detect the cybersecurity monitoring system further comprises initiating a network scan in the computing environment to detect artifacts, workloads, principals, and resources utilized by the cybersecurity monitoring system and indicative that the cybersecurity monitoring system is connected to the computing environment.

9. The method of claim 1, wherein detecting the resource of the first resource type comprises determining, for each detected resource, the resource type based on at least one of: a virtual machine type, a software container type, a serverless function type, an application type, and a storage service type.

10. The method of claim 1, wherein determining that the cybersecurity monitoring system is not configured to monitor the first resource type further comprises determining that the cybersecurity monitoring system is configured to detect a cybersecurity issue on a resource of a second resource type and is not configured to detect the cybersecurity issue on the resource of the first resource type.

11. The method of claim 1, wherein modifying the permission associated with the principal of the third party software connector comprises:

querying an identity and access management server of the computing environment using an identifier of the principal to obtain at least one of a role, a policy, and a permission associated with the principal; and removing, via the identity and access management server, at least one of the role, the policy, and the permission from the principal as part of the mitigation action.

12. The method of claim 11, wherein querying the identity and access management server further comprises obtaining a last credential use time associated with the principal, and wherein removing the at least one of the role, the policy, and the permission from the principal comprises:

determining that the last credential use time indicates that the principal has not utilized a credential for a period of time exceeding a predetermined threshold; and in response to determining that the period of time exceeds the predetermined threshold, removing an administrator-level permission from an external access account associated with the third party software connector, and generating at least one of an alert, a support ticket, and a modification of a severity level of an existing alert or support ticket, as part of the mitigation action.

13. A non-transitory computer-readable medium storing a set of instructions for detecting a protection gap in a cybersecurity system, the set of instructions comprising:

one or more instructions that, when executed by one or more processors of a device, cause the device to:

scan a computing environment to detect a cybersecurity monitoring system connected to the computing environment, the scan comprising detecting, in the computing environment, a connector associated with the cybersecurity monitoring system, the connector deployed as a serverless function in the computing environment;

scan the computing environment to detect a plurality of resources deployed in the computing environment;

detect a resource of the plurality of resources which is of a first resource type, each resource of the plurality of resources being associated with a respective resource type;

query the cybersecurity monitoring system to obtain an indication of monitored assets deployed in the computing environment;

determine that the cybersecurity monitoring system is not configured to monitor the first resource type by determining that the resource of the first resource type is omitted from the indication of monitored assets; and initiate a mitigation action in response to determining that the cybersecurity monitoring system is not configured to monitor the first resource type, the mitigation action comprising, via an identity and management service of the computing environment, modifying a permission associated with a principal of a third party software connector having access to the computing environment by revoking the permission.

14. A system for detecting a protection gap in a cybersecurity system comprising:

a processing circuitry;

a memory, the memory containing instructions that, when executed by the processing circuitry, configure the system to:

scan a computing environment to detect a cybersecurity monitoring system connected to the computing environment the scan comprising detecting, in the computing environment, a connector associated with the cybersecurity monitoring system, the connector deployed as a serverless function in the computing environment;

scan the computing environment to detect a plurality of resources deployed in the computing environment;

detect a resource of the plurality of resources which is of a first resource type, each resource of the plurality of resources being associated with a respective resource type;

query the cybersecurity monitoring system to obtain an indication of monitored assets deployed in the computing environment;

determine that the cybersecurity monitoring system is not configured to monitor the first resource type by determining that the resource of the first resource type is omitted from the indication of monitored assets; and initiate a mitigation action in response to determining that the cybersecurity monitoring system is not configured to monitor the first resource type, the mitigation action comprising, via an identity and acc management service of the computing environment, modifying a permission associated with a principal of a third party software connector having access to the computing environment by revoking the permission.

15. The system of claim 14, wherein the memory contains further instructions which when executed by the processing circuitry further configure the system to:

configure a second cybersecurity monitoring system to connect to the computing environment, wherein the second cybersecurity monitoring system is configured to monitor the first resource type.

16. The system of claim 15, wherein the memory contains further instructions which when executed by the processing circuitry further configure the system to:

detect a protection overlap between the first cybersecurity monitoring system and the second cybersecurity monitoring system.

17. The system of claim 16, wherein the memory contains further instructions which when executed by the processing circuitry further configure the system to:

generate a notification to disable the first cybersecurity monitoring system in response to detecting the protection overlap.

18. The system of claim 14, wherein the memory contains further instructions which when executed by the processing circuitry further configure the system to:

configure the cybersecurity monitoring system to monitor an additional portion of the computing environment, including the resource.

19. The system of claim 14, wherein the memory contains further instructions that, when executed by the processing circuitry for detecting the resource, further configure the system to:

detect any one of:

an operate system, an application, a software library, a software binary, a workload, a virtual machine, a software container, a serverless function, and a combination thereof.

20. The system of claim 14, wherein the memory contains further instructions which when executed by the processing circuitry further configure the system to:

detect a third party software connector in the computing environment; and detect a cybersecurity protection gap between the third party software connector and the computing environment.

* * * * *